US006562922B1

(12) United States Patent
Bansleben et al.

(10) Patent No.: US 6,562,922 B1
(45) Date of Patent: May 13, 2003

(54) VICINAL HYDROXYL GROUP CONTAINING COPOLYMER AND ARTICLES FORMED THEREFROM

(75) Inventors: Donald Albert Bansleben, Columbia, MD (US); Eric Francis Connor, Pasadena, CA (US); Robert Howard Grubbs, South Pasadena, CA (US); William Peyton Roberts, Spartanburg, SC (US)

(73) Assignee: Cryovac, Inc, Duncan, SC (US)

( * ) Notice: Subject to any disclaimer, the term of this patent is extended or adjusted under 35 U.S.C. 154(b) by 0 days.

(21) Appl. No.: 09/274,376

(22) Filed: Mar. 23, 1999

(51) Int. Cl.[7] .................................................. C08F 4/42
(52) U.S. Cl. ....................... 526/161; 526/314; 526/348; 526/348.1; 526/307.5; 526/171
(58) Field of Search ................................ 526/314, 161, 526/348.1, 307.5, 348, 171

(56) References Cited

U.S. PATENT DOCUMENTS

| 3,635,937 A | 1/1972 | Bauer et al. | |
|---|---|---|---|
| 3,644,563 A | 2/1972 | Bauer et al. | |
| 3,647,915 A | 3/1972 | Bauer et al. | |
| 3,686,159 A | 8/1972 | Bauer et al. | |
| 3,969,297 A | * 7/1976 | Teer et al. | ............ 260/29.6 XA |
| 4,293,502 A | 10/1981 | Beach et al. | |
| 4,293,727 A | 10/1981 | Beach et al. | |
| 4,301,318 A | 11/1981 | Beach et al. | |
| 4,310,716 A | 1/1982 | Beach et al. | |
| 4,382,153 A | 5/1983 | Beach et al. | |
| 4,537,982 A | 8/1985 | Starzewski et al. | |
| 4,542,069 A | * 9/1985 | Mauz et al. | ................. 428/402 |
| 5,557,023 A | 9/1996 | Somogyvari et al. | |
| 5,714,556 A | 2/1998 | Johnson et al. | |
| 5,852,145 A | 12/1998 | McLain et al. | |

FOREIGN PATENT DOCUMENTS

| WO | 9623010 | | 1/1996 |
|---|---|---|---|
| WO | 9830609 | | 7/1998 |
| WO | WO 98/42664 | * | 10/1998 |
| WO | WO 98/42665 | * | 10/1998 |
| WO | 9912981 | | 3/1999 |

* cited by examiner

*Primary Examiner*—David W. Wu
*Assistant Examiner*—Ling-Siu Choi
(74) *Attorney, Agent, or Firm*—Howard Troffkin; Daniel Ruble

(57) ABSTRACT

The present invention is directed to vicinal hydroxyl-functionalized hydrocarbon polymers having a mole ratio of methylene to hydroxyl group of greater than 1 and to films, coatings and articles useful in packaging applications containing said polymers.

20 Claims, No Drawings

VICINAL HYDROXYL GROUP CONTAINING COPOLYMER AND ARTICLES FORMED THEREFROM

The present invention was made with United States Government support under Contract No. 70NANB5H1136 awarded by the U.S. Department of Commerce's National Institute of Standards and Technology. The United States has certain rights in the invention.

BACKGROUND INFORMATION

1. Field of the Invention

The present invention is directed to unique vicinal hydroxyl-functionalized hydrocarbon polymers and to films, coatings and articles useful in packaging applications containing said polymers.

2. Background of the Invention

Ethylene/vinyl alcohol (EVOH) copolymers are commonly available and have been used in packaging applications. These copolymers are conventionally formed by free radical copolymerization of ethylene and vinyl acetate followed by conversion of the acetate pendant groups to hydroxyl groups. The resultant EVOH copolymers contain vinyl alcohol units randomly distributed along the polymer chain; have hydroxyl groups (disregarding residual acetate groups) configured head-to-tail when part of adjacent (vinyl alcohol) monomeric units; and have a considerable number of short and long chain branches. Such copolymers have been used as gas (oxygen) barrier films or coatings due to their ability to exhibit low gas permeability. However, this property is susceptible to degradation in the presence of high humidity and, thus, gives reduced protection to the effects of oxygen when used with moist products, such as certain food products and the like.

Several references have disclosed the copolymerization of ethylene and carbon monoxide (See JP 08244180; JP 09235370; JP 08244158). The resultant polyketone is reduced to provide a polyalcohol having a structure in which a single hydroxyl group is pendent from every third carbon of the polymer chain. These polymers, with their highly regular structure, are taught to provide enhanced gas barrier properties.

JP 10204121 also teaches polymers containing a high content of hydroxyl groups. The initially formed vinyl acetate/vinylene carbonate copolymer is converted into hydroxyl group containing polymers by hydrolysis. The resultant copolymer, although taught to be useful as a barrier material, has the deficiencies of having residual acetate groups in the copolymer product, poor film processing characteristics, especially on a commercial scale, and poor compatibility with conventional film forming polymers, such as polyolefins and the like.

Packaging materials, whether in the form of a film (single or multi-layer), or structural design which may be flexible, semi-rigid, or rigid and which may be of a lidded or collapsible design ("Packaging Article"), serve not merely to contain the substance being packaged but, depending on the nature of the substance, to also prevent ingress of harmful substances from the environment or, alternately, egress of volatiles from within a packaging article.

Oxygen from the atmosphere has long been recognized as one of the more harmful substances for many packaged materials, especially foodstuffs. Thus, the teaching herein shall be mainly directed but not limited to Packaging Articles which have high oxygen barrier properties, especially in environments of high relative humidity. The barrier properties are due to having a vicinal dihydroxy-functionalized hydrocarbon polymer of the present invention as part of the Article's structure.

In packaging oxygen sensitive substances, such as foodstuffs, beverages, and pharmaceuticals (collectively "products"), oxygen contamination can be particularly troublesome. Care is generally taken to minimize the introduction or concentration of oxygen or to reduce the detrimental or undesirable effects of oxygen on the foodstuff, pharmaceutical or beverage.

Molecular oxygen ($O_2$) can be reduced to a variety of intermediate species by the addition of one to four electrons; these species are superoxide, hydroxy radical, hydrogen peroxide, and water. $O_2$ and water are relatively unreactive. However, the three intermediate species are very reactive. Also, $O_2$ can be activated to single electron state oxygen (which can undergo subsequent reduction to the more reactive oxygen species) by irradiation, or by the presence of catalytic agents. These reactive oxygen species are free radical in nature, and the oxidative reactions in which they participate are, therefore, autocatalytic.

Carbon-carbon double bonds are particularly susceptible to reaction with the intermediate species. Such carbon-carbon bonds are often found in foods and beverages, pharmaceuticals, dyes, photochemicals, adhesives, rubbers and polymer precursors. Virtually any product which has complex organic constituents will contain such carbon-carbon double bonds or other oxygen reactive components, and hence are susceptible to undergoing oxidative reactions. Thus, if the oxidation products adversely affect the quality, performance, odor or flavor of the packaged product, then preventing oxygen ingress into a Packaging Article will greatly benefit the packaged products' storage life and usefulness.

A number of strategies exist to deal with oxygen which is contained within a Packaging Article's free void space. The most basic is to remove the oxygen by vacuum or by inert gas sparging or both. More recently, oxygen scavenger compositions have been added to polymeric gasket compositions used in certain elements of Packaging Articles (e.g., bottle caps and can closures) as well as in one or more layers of polymeric films used to form Packaging Articles. Such scavenger compositions address the need to remove oxygen from the interior of a closed Packaging Article by reacting or combining with the entrapped oxygen or with oxygen which may enter the Packaging Article during transportation or storage. Although these are methods and compositions which address the concerns with entrapped oxygen, they do not primarily address the problems associated with entry of oxygen and other contaminants into a Packaging Article from the exterior environment.

Glass and metals provide packaging materials which have extremely good barrier properties with respect to the ingress of substances from the exterior environment. However, these packaging materials are costly, provide Packaging Articles which are heavy, rigid in construction and, in the case of glass, are breakable.

Polymers have also been used extensively in packaging applications where they have many advantages over the use of glass or metal. The advantages are derived from the diversity of polymers themselves in their mechanical, thermal, chemical resistance and optical properties and from the diversity and adaptability of fabrication techniques which can be employed. Thus, flexible bags, semi-rigid and rigid containers as well as clinging and shrinkable films can be made into Packaging Articles which have walls of homogeneous, laminated, coextruded, thermoformed or coated structure.

Further, packaging materials and the articles may be formed of a single layer (one composition throughout its thickness) or as a multi-layer structure wherein different layers of the structure are present to provide a combination of desired properties. For example, one or both surface layers may be composed of polymer(s) having groups which provide heat sealing properties. Other layers may be formed of polymers having high tensile strength to impart tear resistance to the resultant film or article. Similarly, polymers or blends of polymers may be used in different layers of a multi-ply material to impart gas barrier properties, printability characteristics, strength, heat shrink properties, adhesion between other layers which otherwise have poor adhesion properties to each other, as well as other properties desired of the resultant Packaging Article.

It has been presently found that improved packaging materials can be formed by utilizing the subject polymers which have a hydrocarbon backbone chain (preferably one which is substantially devoid of side chains), have a sufficient carbon to hydroxyl group ratio and have vicinal dihydroxyl groups directly pendent from the polymer chain to provide desired properties of compatibility with other polymers, resistivity to the effects of moisture, processability to produce a film, thermoformable or coated high barrier product.

Thus, it is the object of the present invention to provide a novel polymer composition having vicinal hydroxyl groups directly pendent from the polymer chain and, further, wherein the dihydroxyl groups have a cis steric configuration with respect to each other of a vicinal pair and, still further, wherein the vicinal hydroxyl groups are randomly located along the hydrocarbon polymer chain.

It is further an object of the present invention to provide a novel polymer having vicinal hydroxyl groups directly pendent from the polymer chain and wherein the polymer chain is a substantially linear hydrocarbon polymer chain.

It is still further an object of the present invention to provide packaging material and Packaging Articles formed therefrom having a structure composed of at least one layer wherein at least one of said layer(s) of the structure comprises a hydrocarbon polymer having hydroxyl groups pendent from vicinal carbon atoms of the polymer chain and methylene to hydroxyl group content which provides compatibility of the polymer with polyolefins and the like film forming materials for packaging applications.

It is further an object of the present invention to provide packaging material and Packaging Articles formed therefrom which are capable of exhibiting very low degrees of gas (e.g., oxygen) permeability and are capable of maintaining said low permeability irrespective of environmental moisture content.

SUMMARY OF THE INVENTION

The present invention provides novel hydroxyl-functionalized, hydrocarbon polymers having hydroxyl groups pendent from vicinal carbon atoms of the polymer chain. The present invention is still further directed to packaging materials and Packaging Articles which have, as part of their structure, the polymers which are the subject of the present invention.

The present invention is further directed to the formation of a substantially linear hydrocarbon polymer having vicinal hydroxyl groups pendent from the polymer backbone chain and the use of said polymers as an oxygen barrier in packaging applications.

DETAILED DESCRIPTION OF PREFERRED EMBODIMENTS

The present invention is directed to a hydrocarbon polymer having hydroxyl groups pendent from vicinal carbon atoms of the polymer backbone chain and in a cis steric configuration within each hydroxyl pair (herein after referred to as "Polymer"); to a substantially linear hydrocarbon polymer having hydroxyl groups pendent from vicinal carbon atoms of the polymer backbone chain and in a cis steric configuration within each hydroxyl pair (herein after referred to as "Linear Polymer") and to packaging materials and Packaging Articles having at least one layer composed of said Polymer and/or Linear Polymer.

The following terms are defined herein below to aid in providing a clear teaching of the present invention:

"hydrocarbyl" refers to a univalent organic group composed of hydrogen and carbon, preferably containing from 1 to 40 carbon atoms;

"hydrocarbylene" refers to a divalent organic group composed of hydrogen and carbon which may include aliphatic, aromatic and mixed aliphatic/aromatic groups;

"hydrocarbyloxy" or "oxyhydrocarbyl" refers to a univalent organic group composed of hydrogen, oxygen and carbon wherein the oxygen may be in the form of one or more ether oxygen, ester oxygen, ketone, aldehyde or carboxylic acid group(s) or mixtures thereof;

"hydrocarbyloxyene" or "oxyhydrocarbylene" refer to a divalent organic group composed of hydrogen, oxygen and carbon atoms wherein the oxygen atom may be in the form of an ether oxygen, ester oxygen, ketone, aldehyde or carboxylic acid group(s) or mixtures thereof;

"fluorinated" means that one or more of its hydrogen atoms of a hydrogen-carbon moiety has been substituted by fluorine atoms;

"functional group" refers to ester, alcohol, carboxylic acid, halogen, primary, secondary and tertiary amine, aldehyde, ketone, hydroxyl, nitro, and sulfonyl groups;

"aryl" and "arylene" refer, respectively, to a monovalent and divalent carbocyclic aromatic ring which may consist of one or a plurality of rings (fused or non-fused);

"substituted" in reference to moieties, means a moiety having one or more groups which do not interfere with the synthesis of the compound or the polymerization process for which the compound is contemplated, wherein said one or more groups may be a hydrocarbyl, hydrocarbylene, oxyhydrocarbyl, oxyhydrocarbylene, inert functional group or the like;

"polymerization Unit" refers to a unit of a polymer derived from a monomer used in the polymerization reaction. For example, the phrase "alpha-olefin polymerization units" refers to a unit in, for example, an alpha-olefin/vinyl aromatic copolymer, the polymerization unit being that residue which is derived from the alpha-olefin monomer after it reacts to become a component of the polymer chain;

"polyolefin" refers to any polymerized olefin, which can be linear, branched, cyclic, aliphatic, aromatic, substituted, or unsubstituted. More specifically, included in the term polyolefin are homopolymers of olefins, copolymers of olefins, copolymers of an olefin and an non-olefinic comonomer copolymerizable with the olefin, such as vinyl monomers, modified polymers thereof, and the like. Specific examples include polypropylene homopolymers, polyethylene homopolymers, poly-butene, propylene/alpha-olefin copolymers, ethylene/alpha-olefin copolymers, butene/alpha-olefin copolymers, ethylene/vinyl acetate copolymers, ethylene/ethyl acrylate copolymers, ethylene/butyl acrylate copolymers, ethylene/methyl acrylate copolymers, ethylene/acrylic acid copolymers, ethylene/methacrylic acid copolymers, modified polyolefin resins, ionomer resins, polymethylpentene, etc. and the like.

The present Polymer is derived from a precursor copolymer formed by free radical polymerization of vinylene carbonate and at least one 1-olefin wherein the 1-olefin is selected from ethylene (preferred), propylene or butene. Free radical polymerization is normally carried out at elevated pressures and temperatures. The temperature should be sufficient to cause the free radical precursor (which is stable at ambient temperatures) to provide a free radical initiation species (e.g. above about 40° C., preferably greater than about 50° C.). Free radical initiators are well known and include, for example azo compounds such as azobisisobutyronitrile and the like; peroxides such as benzoyl peroxide, di-tert-butyl peroxide and the like; and hydroperoxides such as tert-butyl hydroperoxide and the like. Free radical polymerization is normally carried out at elevated pressures of greater than 7 Mpa (1000 kg/cm$^2$). For example, Vysokomol. Soedin., 8(10), 1721–1726 (1966) reports the preparation of ethylene-vinylene carbonate copolymers having from 4 to 67 mol percent vinylene carbonate. The polymerization was carried out under elevated temperature and pressure using azobisisobutyronitrile as the free radical initiator. Similarly, S. M. Samoilov et al., USSR Plast. Massy, Issue 7, 15–17 (1969) describes the preparation of ethylene-vinyl carbonate copolymers under high pressure conditions. The copolymers formed by free radical polymerization yielded copolymer products having a significant amount of short and long chain branches.

The present Linear Polymer is formed from copolymers of vinylene carbonate and at least one 1-olefin (e.g., ethylene, propylene, 1-butene), such as those formed by polymerization in the presence of a neutral late transition metal salicylaldimine or pyrrolaldimine chelate catalyst as disclosed in copending U.S. patent application Ser. No. 09/274,379 filed concurrently with the present application. The teachings of said application are incorporated herein in their entirety by reference.

The subject vicinal dihydroxyl group containing polymers (i.e., Polymers and Linear Polymers) have been unexpectedly found to provide enhanced gas barrier properties and be compatible with numerous other conventional film forming polymers such as polyolefins as, for example, polyethylene, low density polyethylene, linear low density polyethylene, polypropylene, polybutene as well as copolymers thereof, including copolymers of a mixture of 1-olefins and copolymers of a mixture of an olefin and a nonolefinic comonomer which are copolymerizable with the olefin, such as vinyl monomers (e.g., vinyl acetate) and the like.

In addition, the subject vicinal dihydroxyl group containing polymers (Polymers and Linear Polymers) have been unexpectedly found to provide the above described enhanced gas barrier properties and compatibility properties and, in addition, have unexpectedly been found to achieve enhanced interlaminar adhesion (tie) between adjacent layers of multi-layer films.

Still further, the subject vicinal dihydroxyl group containing polymers (Polymers and Linear Polymers) have been found to have the above described properties and exhibit desired gas barrier properties under both low and high humidity conditions.

The present invention is directed to the formation of Polymer or Linear Polymer from precursor copolymers of vinylene carbonate and at least one 1-olefin such as ethylene, propylene, 1-butene and the like. The 1-olefin is preferably ethylene or propylene or mixtures thereof. The most preferred copolymers are those formed from vinylene carbonate and ethylene. The formed precursor copolymer can be represented by the formula:

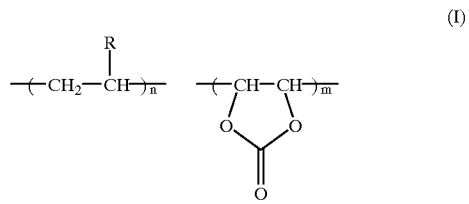

(I)

wherein R represents hydrogen or a $C_1$–$C_2$ alkyl group; and m and n are integers defining the mole ratio of each unit present in the copolymer provided n may range from at least 0.51, preferably 0.52 to 0.99 and m may range up to 0.49, preferably from 0.01 to 0.48.

The copolymerization, to provide the linear copolymer (precursor to Linear Polymer), is conducted by contacting the monomers in the presence of a single component, non-ionic (neutral) polymerization catalyst. The catalysts found useful in providing the substantially linear copolymers are non-ionic (neutral) late transition metal chelates of bidentate salicylaldimine ligands or pyrrolaldimine ligands. These chelates are described in PCT published applications WO 98/42664 and WO 98/42665 as well as copending U.S. application Ser. No. 09/274,377 and U.S. application Ser. No. 09/274,378. The teachings of each of said referenced patent applications are incorporated herein in their entirety by reference.

The non-ionic late transition metal chelate found for forming the linear precursor copolymer useful can be selected from a bidentate salicylaldimine complex represented by the formula:

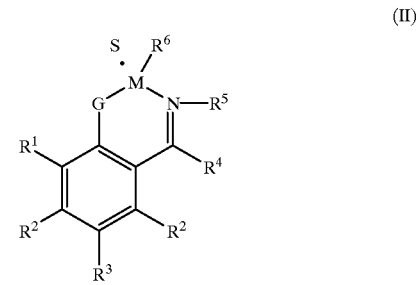

(II)

or bidentate pyrrolaldimine complex represented by the formula:

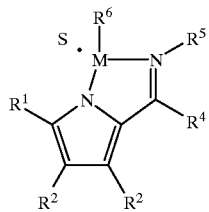
(III)

In these formulae,
R¹ is a $C_4$–$C_{24}$ hydrocarbyl, a substituted $C_4$–$C_{24}$ hydrocarbyl which preferably is a sterically bulky hydrocarbyl such as an aryl, substituted aryl, aralkyl or a branched alkyl, a $C_4$–$C_{24}$ hydrocarbyloxy or the R¹ group with an R² group on a vicinal carbon atom together form a hydrocarbylene or hydrocarbyloxyene ring;

each R² independently is H, a $C_1$–$C_{24}$ hydrocarbyl, a substituted $C_1$–$C_{24}$ hydrocarbyl, an inert functional group, or any two vicinal R² groups together or with an R¹ or R³ group on a vicinal carbon atom together form a hydrocarbylene or hydrocarbyloxyene ring;

R³ is H, a $C_1$–$C_{24}$ hydrocarbyl, a substituted $C_1$–$C_{24}$ hydrocarbyl, an inert functional group, or the R³ group with an R² group on a vicinal carbon atom together form a hydrocarbylene or hydrocarbyloxyene ring;

each R⁴ independently is H, a $C_1$–$C_{24}$ hydrocarbyl, or a substituted $C_1$–$C_{24}$ hydrocarbyl;

R⁵ is a sterically bulky $C_6$–$C_{24}$ hydrocarbyl or a sterically bulky $C_6$–$C_{24}$ substituted hydrocarbyl, preferably methyl or an aryl, aralkyl, or a substituted aryl;

R⁶ is H, a $C_1$–$C_1$ i alkyl (preferably a tertiary alkyl, —CRRR, where each R independently is a $C_1$–$C_{12}$ hydrocarbyl, more preferably a $C_1$–$C_3$ alkyl), aryl or substituted aryl, with methyl being most preferred;

G is O (preferred), S, or an —NR group where R is a $C_1$–$C_{11}$ alkyl, aryl or substituted aryl;

S is a coordination ligand or an aprotic polar compound such as
a phosphine as for example triphenylphosphine, tri ($C_1$–$C_6$ alkyl) phosphine, tricycloalkyl phosphine, diphenylalkyl phosphine, dialkyl phenylphosphine and the like,
a tertiary amine as for example trialkylamine,
a $C_2$–$C_{20}$ alkene such as ethylene, propylene, butene, hexene, octene, decene, dodecene, and the like,
a substituted alkene wherein the substituent may be a halogen atom (preferably chloro), an ester group, a $C_1$–$C_4$ alkoxy group, an amine group (—$NR_2$ wherein each R individually is selected from a $C_1$–$C_3$ alkyl); or
an aprotic polar compound (preferred) such as a nitrile (e.g., acetonitrile (most preferred), propionitrile, butyronitrile, benzonitrile, and the like), an ether (e.g., tetrahydrofuran, glyme, diglyme, and the like), or an aromatic heterocyclic amine (e.g., pyridine, 2,6-lutidine, and the like); and M is a transition metal selected from Fe, Co, Ni, Ru, Rh, Pd, Os, Ir, and Pt in the +2 oxidation state, preferably Ni or Pd, and most preferably Ni.

When the copolymerization is carried out by conventional slurry process, it is preferred that the above non-ionic chelate catalyst be carried on or bonded to a support material. The support can be an organic or inorganic material having a macromolecular structure. The organic material may be a high molecular weight, inert (to the polymerization reaction and copolymer product) polymer. The inorganic support may be selected from an inorganic oxide such as, for example, silicas, titanias, alumina-silicates, alumina phosphates, aluminas, clays and mixtures thereof, with silicas or aluminas being preferred and silicas being most preferred. The chelate is preferably bonded through a hydrocarbylene or substituted hydrocarbylene group to a support material. Such supported catalysts are disclosed in copending U.S. application Ser. No. 09/274,377 filed concurrently with the present U.S. patent application which teaching is incorporated herein in its entirety by reference.

The polymerization process, to provide the precursor copolymer of the subject Linear Polymer, should be conducted by contacting the monomers of vinylene carbonate and at least one 1-olefin, as described above in the presence of the above-described non-ionic bidentate chelate catalyst. The process should be carried out at relatively low temperatures of from about −100° C. to 90° C., preferably from about 0° to 80° C. and most preferably between 10° C. and 70° C. With all ranges of temperature within the above being included. Additionally, the polymerization preferably is carried out at relatively low pressure, e.g., a pressure of from atmospheric pressure to about 10.5 MPa (1,500 psig) and preferably from atmospheric pressure to 7 MPa (1,000 psig) with all ranges of pressure within the above being included.

The polymerization preferably is carried out in a liquid which acts as a medium in which the metal chelate and monomers contact one another. The liquid may be composed of the monomer(s), per se or in combination with any organic compound which is liquid at the reaction conditions and inert to the reactants, catalyst and product(s). Suitable organic liquids include alkanes, cycloalkanes, halogenated alkanes, aromatics, halogenated aromatic hydrocarbons and ethers. Specific useful solvents include hexane, heptane, toluene, xylene, benzene, methylene chloride, chlorobenzene, and tetrahydrofuran and the like. The preferred solvents to be used are toluene, benzene or methylene chloride.

In addition to the inert liquid medium described above, the reaction medium may contain an aprotic polar liquid. Such liquids include, for example, ethers such as diethyl ether, glyme, diglyme, tetrahydrofuran and the like; a nitrile such as acetonitrile, propionitrile, benzonitrile and the like; an aldehyde or ketone such as acetone, propanone, cyclohexanone, acetaldehyde, benzaldehyde and the like; alcohols such as methanol, ethanol, propanol, butanol and the like; organic esters such as ethyl acetate, propyl acetate, ethyl laurate and the like; nitroorganics such as nitropropane, nitrobenzene and the like; as well as mixtures thereof.

The molar ratio of vinylene carbonate to the 1-olefin used as monomer feed may range from about 0.1:1 to 25:1 with from about 0.1:1 to 15:1 being preferred. The molar ratio of the monomers should be such that the resultant polymer has a mole ratio of methylene (—$CH_2$—) groups to carbonate groups capable, upon hydrolysis as described below, of providing a monomeric unit n to m ratio of greater than 1, preferably at least about 1.1 and more preferably at least about 1.2.

The ratio of monomers to be used in the feed will depend on the ratio of n to m monomeric units desired in the copolymer (I) formed. The exact ratio of the monomers to achieve the desired copolymer composition can be determined by simple experimentation. In forming the precursor copolymer of the Linear Polymer, the chelate should be present in an amount such that the molar quantity of transition metal chelate per deciliter of solvent is from 0.1 to 100 micromoles with from 1 to 75 being preferred.

The Linear Polymer formed by the present process has been found to have a substantially linear structure (excluding the alkyl group derived from the 1-olefin monomer) when other than ethylene is used. The amount of short chain branching (side chains having a $C_1$–$C_6$ alkyl group) is low and is usually expressed in terms of the number of $C_1$–$C_6$ alkyl branches per 1000 carbon atoms. The number of such branches in Linear Polymer of the present invention range from 0 to about 40 branches, with from 0 to about 30 being readily achieved and from 0 to 10 being preferred. Polymers with very low branching (<5) levels are obtainable. Further the Linear Polymer formed according to the present invention is substantially devoid of long chain branches (pendent $C_7$ or higher alkyl group chains). Long chain branches number from 0 to about 5 per 1000 carbon atoms and most often from 0 to 1 per 1000 carbon atoms. Branching can be determined by NMR spectroscopy which can provide an analysis of the total number of branches, branch distribution, and to some extent the branch length. Alternately, the branch content can be estimated from correlation of total branches as determined by NMR spectroscopy with polymer melting point as determined by differential scanning calorimetry (DSC).

The precursor vinylene carbonate/1-olefin copolymers formed should have a weight average molecular weight of at least about 10,000.

The mole percentage of vinylene carbonate with respect to the produced copolymer may range from about 0.1% to 48 mole % with from 0.1% to 30 mole % being readily achieved. The exact amount depends on the concentration of vinylene carbonate in the polymerization feed stream, the choice of metal chelate and the polymerization conditions used.

It has been determined that the initially formed vinylene carbonate/1-olefin copolymers (either branched or linear) provide a distinct means of achieving vicinal dihydroxy group containing hydrocarbon polymers. These copolymers can be subjected to hydrolysis using an aqueous acidic solution such as an aqueous solution of hydrochloric acid or more preferably, an aqueous basic solution such as an aqueous solution of an alkali metal hydroxide (e.g., sodium hydroxide). The resultant polymer has pairs of hydroxyl groups along the polymer chain which are pendent from vicinal (adjacent) carbon atoms of the hydrocarbon backbone chain of the polymer and are in a cis steric configuration. These polymers can be represented by the formula:

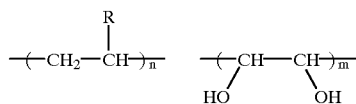

(IV)

wherein
R represents hydrogen or a $C_1$–$C_2$ alkyl depending on the starting alpha-olefin used to form the precursor copolymer. R is preferably hydrogen or methyl and most preferably hydrogen; and m and n are integers representing the molar fraction of each polymerization unit provided n may range from at least 0.51, preferably 0.52 to 0.99 and m may range up to 0.49 with from 0.01 to 0.48 be preferred.

The formed vicinal dihydroxy-group containing Linear Polymer has low branching properties described above with respect to vinylene carbonate/1-olefin copolymers formed by the late transition metal chelate catalyzed polymerization process.

The formed vicinal dihydroxy-group containing Polymer and Linear Polymer are useful as an oxygen barrier layer in a packaging material and in Packaging Articles. For example, the vicinal hydroxy-group containing Polymer and Linear Polymer can be used to provide an oxygen barrier layer in a single layer or multi-layer packaging product.

The present polymers can be viewed as a replacement for ethylene/vinyl alcohol (EVOH) copolymers commonly used in barrier type packaging films or structures. As previously stated, conventional EVOH copolymers generally contain vinyl alcohol units randomly distributed within the polymer structure have a highly branched structure and provide hydroxyl groups as single pendent units. In contrast, the presently produced Linear Polymer provides hydroxyl groups in pairs on vicinal carbon atoms of the polymer chain, provides the pair of hydroxyl groups in a cis steric configuration and provides a linear polymer free of long (greater than $C_6$) chain branches and substantially free of short chain branches.

Further, in contrast to conventional EVOH, the presently produced Polymer provides hydroxyl groups in pairs an vicinal carbon atoms of the polymer chain and provides the pair of hydroxyl groups in a cis steric configuration.

Further, in contrast to conventional EVOH and polyvinylalcohol, the present polymers (Polymers and Linear Polymers) have a mole ratio of methylene (—$CH_2$—) units to hydroxyl units of greater than 1, preferably greater than 1.1 and most preferably greater than 1.2 with the hydroxyl groups being in vicinal pairs directly pendent from the polymer's backbone carbon atoms and in a cis steric configuration.

As indicated above, the present polymers can form at least one layer of a packaging material such as a film, thermoformed article or the like of the subject invention. When the material is of a single layer structure, such material can be formed by extrusion, solution casting, injection molding or extrusion/thermoforming processes. When the material is of a multi-layer structure, they are typically formed using co-extrusion, coating, lamination, blow molding, coextrusion/thermoforming, extrusion/coating, or extrusion/lamination processes, such as taught in U.S. Pat. Nos. 5,350,622 and 5,529,833, the teachings of which are incorporated herein in their entirety by reference.

The layers of the packaging material which contain the subject polymer can be formed solely of one or more of the subject polymers. It has been unexpectedly found that material containing such layer has enhanced physical properties, such as enhanced flexibility, toughness and elongation as well as gas (e.g., oxygen) barrier functionality when compared to like packaging material containing a layer of conventional (EVOH) copolymer of like hydroxyl group content. Alternately, the layer of packaging material which contains the subject polymer may be in the form of a composition comprising the present vicinal dihydroxy-group containing polymer uniformly distributed, blended or dispersed in other polymer(s). It is preferred that the composition retain a high degree of optical transparency, as such property is highly desired in the packaging art and, further, may indicate the compatibility of the particular polymer and the carrier polymer used. The present polymer preferably is the major component of the composition, i.e., at least about 60 weight percent, and more preferably at least about 75 weight percent. The other polymer(s) can be any thermoplastic polymer such as polyvinyl chloride, ethylene/ vinylacetate copolymer, polyethylene terephthalate, polyethylene, polypropylene or copolymers thereof. For example, the vicinal dihydroxy-group containing polymers described herein may be blended with a conventional EVOH copolymer for a particular end-use. The exact nature of the carrier polymer and the amount to be blended with the presently described polymer can be readily determined by the artisan based on the end use, the desired transparency and the degree of functionality to be exhibited by the packaging film.

The layer of the packaging material containing the subject polymers may be of any thickness. The exact thickness will depend on its particular function as part of the end product article, such as that of a packaging material as well as the structure of the article (film or semi-rigid or rigid article). With respect to films, the thickness can range from about 0.6 to 250 $\mu$m (0.025 to 10 mils), preferably from about 1.3 to 200 $\mu$m (0.05 to 8 mils) and most preferably from about 2.5 to 125 $\mu$m (0.1 to 5 mils). Where the material is used as, or as part of, a semi-rigid or rigid article, the layer containing the polymers of the present invention may range from about 0.6 to 250 $\mu$m (0.025 mil to 10 mils), preferably from 1.3 to 200 $\mu$m (0.05 mil to 8 mils). The exact thickness can be determined by the artisan for the particular application.

The composition of the layer comprising the subject polymers defined herein can further contain other components, such as pigments, reinforcing fillers, minerals such as clays, exfoliated clays (e.g., nanocomposite utility), mica, talc and the like; stabilizers such as primary or secondary antioxidants, processing aids, plasticizers, fire retardants, anti-fog agents, dyestuff and the like, or non-reinforcing or conductive fillers. The total quantity of said additives is generally less than 10 wt. %, and usually less than 5 wt. % by weight relative to the total composition. The selection of such components depends largely on the material and article to be formed, its method of formation and its contemplated end use. Selection factors for such components are well known in the art.

The packaging material of the present invention can be composed of a single layer or multi-layer structure wherein at least one layer comprises the subject Polymer and/or Linear Polymer described above. These polymers may further be crosslinked such as by actinic radiation and/or oriented by stretching (unit or biaxially) as may be desired by those skilled in the art. Thus, a multi-layer packaging material containing a gas barrier layer may comprise a vicinal dihydroxy-functionalized polymer and a sealant layer wherein the functionality in the sealant layer is selected from carboxylate ester groups or simply linear low density polyethylene. In many multi-layer structures, at least one surface layer (and optionally, both surface layers) are structural and abuse-protective layers, such as formed from an olefinic thermoplastic material as, for example, polypropylene, low density polyethylene, linear low density polyethylene (LLDPE) and the like. Inner layer(s) between the surface layers can include a gas barrier as, for example, composed of the subject vicinal dihydroxy-polymers, bulk layer(s) and tie layer(s) to provide interply adhesion.

Specific examples of multilayer structures useful as packaging materials include a three-layer structure composed of a gas (e.g., $O_2$) barrier layer, a tie layer including the subject copolymer, and a heat sealable layer which may include an olefin copolymer such as, for example, ethylene/1-olefin copolymers, ethylene/ unsaturated ester copolymer (e.g., ethylene/vinyl acetate or ethylene/alkyl acrylate copolymers), and the like; and a four-layer structure composed of the three layers from the foregoing structure with an outer abuse layer, which can include a polyolefin (e.g., polyethylene, polypropylene, or the like), adjacent to the barrier layer.

Multilayer structures also can contain an oxygen-scavenging layer as an inner layer. Scavenger layers typically include a carrier polymer which contains an agent capable of interacting with or absorbing and/or reacting with oxygen from the interior cavity of the formed article. A packaging material incorporating such a layer can have a structure such as, for example, the four-layer structure just described with a scavenging layer between the tie layer and the heat sealable layer.

Multilayer film used to package oxygen-sensitive items such as food, beverages, or pharmaceuticals, may, for example, comprise at least one anhydride-grafted polyolefin layer adjacent to a layer comprising the subject Polymer and/or Linear Polymer "P and/or LP" prepared by coextrusion, coating, extrusion coating, and/or lamination. The resultant film can be oriented by tenter frame or bubble orientation and/or crosslinked by actinic irradiation. This film is formed into a heat-sealed package which, in the case where it had been previously oriented, may have greater than 10% free shrink above 160 degrees F.

A further example of a multilayer film used to package oxygen-sensitive items such as food, beverages, or pharmaceuticals, may, for example, comprise at least one heat-sealable polyolefin layer along with P and/or LP. This film, or a portion thereof, can be prepared by coextrusion, coating, extrusion coating, and/or lamination and (optionally) oriented by tenter frame or bubble orientation techniques and/or crosslinked by actinic irradiation. This film is formed into a heat-sealed package which, in the case where it had been previously oriented, may have greater than 10% free shrink above 160 degrees F.

Another multilayer film used to package oxygen-sensitive items such as food, beverages, or pharmaceuticals, may, for example, comprise at least two heat-sealable polyolefin layers on either side of P and/or LP. This film, or a portion thereof, can be prepared by coextrusion, coating, extrusion coating, and/or lamination and (optionally) oriented by tenter frame or bubble orientation techniques and/or crosslinked by actinic irradiation. This film is formed into a heat-sealed package which, in the case where it had been previously oriented, may have greater than 10% free shrink above 160 degrees F.

Still another multilayer film used to package oxygen-sensitive items such as food, beverages, or pharmaceuticals, may, for example, comprise at least one nylon layer adjacent to P and/or LP. This film, or a portion thereof, can be prepared by coextrusion, coating, extrusion coating, and/or lamination and (optionally) oriented by tenter frame or bubble orientation techniques and/or crosslinked by actinic irradiation. This film is formed into a heat-sealed package which, in the case where it had been previously oriented, may have greater than 10% free shrink above 160 degrees F. It can be used to form a casing or bag for cook-in packaging of meat products. It can also be thermoformed prior to conversion into a package.

Further, a multilayer bottle or cup used to package oxygen-sensitive items such as food, beverages, or pharmaceuticals, may, for example, comprise at least one polyester, polyethylene, or polypropylene layer along with P and/or LP. This bottle can be prepared by coextrusion followed by thermoforming and/or blow molding, or it can be prepared by injection molding of multiple layers followed by thermoforming or blow molding. This bottle may also be prepared by coating of P and/or LP onto the other layer or layers, either before or after blow molding or thermoforming is carried out to produce the bottle or cup.

The following examples are given for illustrative purposes only and are not meant to be a limitation on the claims, appended hereto. All parts and percentages are by weight unless otherwise indicated.

EXAMPLES

Example 1

Copolymerization of Ethylene with Vinylene Carbonate by Neutral Nickel(II) Salicylaldimine Complex In a dry box, a 6 ounce glass pressure bottle was charged with neutral nickel(II) salicylaldimine (60 μmoles) complex ($R^1$=9-anthracene, $R^2$=$R^3$=$R^4$=H, $R^5$=2,6-diisopropylphenyl, $R^6$=$CH_3$, S=$CH_3CN$). The bottle was fitted with a mechanical stirrer, a thermocouple, and ports for the addition of liquid and gas. Degassed toluene (85 mL) was added by cannula. Vinylene carbonate (1600 equivalents with respect to the nickel(II) complex) was added as a toluene (5 mL) solution by cannula. The reactor was immediately pressurized to and maintained at 0.72 MPa (90 psig) with ethylene.

The copolymerization was allowed to proceed with stirring for one hour without temperature control. Ethylene gas was vented from the bottle and the contents of the bottle were poured into acidified methanol. The precipitated copolymer was collected on a frit as a white solid, washed with methanol and dried in vacuo.

Yield of copolymer was 2.2 g. An FTIR spectrum showed a carbonate C=O stretch at 1818 $cm^{-1}$. The weight-average molecular weight of the copolymer was 83,900 (relative to polystyrene standards) as determined by GPC analysis in trichlorobenzene at 135° C. and a melting point ($2^{nd}$ heat) of 125.4° C. as determined by differential scanning calorimetry.

Example 2

Copolymerization of Ethylene with Vinylene Carbonate in Presence of Diglyme (Lewis Base) Additive In a dry box, 0.050 g of 3-(9-anthracene)-substituted neutral nickel(II) salicylaldimine complex ($R^1$=9-anthracene, $R^2$=$R^3$=$R^4$=H, $R^5$=2,6-diisopropylphenyl, S=triphenylphosphine and $R^6$=phenyl) was weighed into a glass pressure bottle equipped with a mechanical stirrer assembly, a thermocouple and addition ports for introduction of liquid and gas. The assembled bottle was removed from the dry box and flushed with ethylene. Dry toluene (90 mL) was added to the reactor by cannula. The bottle was partially immersed in a water bath which warmed the contents to 40° C. After the catalyst had dissolved to give a yellow solution, a solution of vinylene carbonate (1.0 g, 11.6 mmol) in toluene (10 mL) was added through a stainless steel vessel pressurized to about 0.45 MPa (50 psig) with ethylene and diglyme (9.9 mL) was immediately added to the glass reactor in similar fashion. The ethylene pressure of the reactor was set and maintained at 0.45 MPa (50 psig).

The reaction was allowed to proceed for one hour. During this time, the clear yellow solution changed to an orange cloudy mixture. The reaction was terminated by venting the ethylene pressure and pouring the contents of the vessel into acidified acetone (1 L). The precipitated copolymer was collected on a glass frit by filtration, washed with acetone (2×250 mL) and dried in a vacuum oven.

The yield of white copolymer was 5.15 g. The copolymer was analyzed by $^{13}$NMR which showed the incorporation of 0.5 mol % vinylene carbonate into the copolymer. The peak melting temperature of poly(ethylene-co-vinylene carbonate) was 124.0° C. as determined by differential scanning calorimetry.

Example 3

Copolymerization of Ethylene with Vinylene Carbonate in Presence of Diethyl Ether (Lewis Base) Additive In a dry box, 0.050 g of 3-(9-anthracene)-substituted neutral nickel(II) salicylaldimine complex ($R^1$=9-anthracene, $R^2$=$R^3$=$R^4$=H, $R^5$=2,6-diisopropylphenyl, S=triphenylphosphine and $R^6$=phenyl) was weighed into a glass pressure bottle equipped with a mechanical stirrer assembly, a thermocouple and an addition port for introduction of liquids. The assembled bottle was removed from the dry box and flushed with ethylene. Dry toluene (90 mL) was added to the reactor by cannula. The bottle was partially immersed in a water bath which warmed the contents of the vessel to 40° C. After the catalyst had dissolved to give a yellow solution, distilled diethyl ether (20 mL) was added by syringe under an ethylene atmosphere. Immediately following addition of the diethyl ether, a solution of vinylene carbonate (1.0 g, 11.6 mmol) in dry toluene (5 mL) was added to the glass reactor in similar fashion. The ethylene pressure of the reactor was set and maintained at 0.45 MPa (50 psig).

The reaction was allowed to proceed with stirring for 30 minutes. During this time, the clear yellow solution changed to an orange cloudy mixture. The reaction was terminated by venting the ethylene pressure and pouring the contents of the vessel into acidified acetone (1 L). The precipitated copolymer was collected on a glass frit by filtration, washed with acetone (2×250 mL) and dried in a vacuum oven.

Yield of white copolymer was 6.84 g. The copolymer was analyzed by $^{13}$NMR which showed the incorporation of 1.0 mol % vinylene carbonate into the copolymer. The peak melting temperature of poly(ethylene-co-vinylene carbonate) was 122.9° C. as determined by DSC.

Example 4

Formation of Vicinal Diol Containing Polymer

Using the copolymers of Examples 1–3 above, the corresponding copolymers with vicinal hydroxyl groups pendant to the polymer backbone are prepared. The copolymers of Examples 1–3 are hydrolyzed under basic conditions using sodium hydroxide. The poly(ethylene-co-vinylene carbonate) of Example 1–3 above is first dissolved in a mixture of tetrahydrofuran and methanol (50/50 V/V) in a flask which is maintained under an argon atmosphere. A solution of 2N potassium hydroxide in THF/methanol is then added and the combined mixture is stirred and heated to 50° C. for 5 hours. After this time, the THF/methanol mixture containing the copolymer product is treated with 2N HCl until the pH is slightly acidic. The hydrolyzed copolymer which contains vicinal hydroxyl groups is collected as a white solid by filtration, washed with methanol (2×50 mL) and dried under vacuum. The FTIR spectrum shows the absence of a carbonate carbonyl absorption at 1818 $cm^{-1}$ which is characteristically present in the copolymer before hydrolysis. The copolymer containing vicinal hydroxyl groups is found to have utility in packaging applications.

We claim:

1. A polymer represented by the formula $$-(CH_2-CH)_n- \quad -(CH-CH)_m- \atop \phantom{xxxxxxxxxxxxxx} HO \quad OH \atop \phantom{xx} R \phantom{xxxxxxxxxxxxxxxxx}$$
(IV)

wherein

R represents hydrogen or a $C_1$–$C_2$ alkyl group or mixtures thereof;

n and m represent mole fractions wherein n is at least about 0.51 and m is up to about 0.49;

said polymer is substantially linear having a degree of short chain branching of less than 40 branches per 1000 carbon atoms and a degree of long chain branching of from 0 to about 5 branches per 1000 carbon atoms; and the hydroxyl groups of said m units are on vicinal carbon atoms and are in a cis steric orientation.

2. The polymer of claim 1 wherein said polymer is substantially linear having less than about 1 long chain branches per 1000 carbon atoms.

3. The polymer of claim 1 wherein R represents a hydrogen atom.

4. The polymer of claim 1 wherein said polymer further comprises non-olefinic polymerization units.

5. A polymer formed by contacting the monomers of vinylene carbonate and at least one 1-olefin at temperatures of from 0 to 90° C. and at a pressure of from 1 atmosphere to 1500 psig in the presence of a non-ionic late transition metal chelate of a salicylaldimine ligand or a pyrrolaldimine ligand for a period of time sufficient to cause copolymerization of said monomers and produce a substantially linear copolymer having a degree of short chain branching of less than 40 branches per 1000 carbon atoms and a degree of long chain branching of from 0 to about 5 branches per 1000 carbon atoms; and hydrolyzing the copolymer to convert the carbonate groups of said copolymer to vicinal dihydroxyl groups pendent from the polymer backbone chain, and recovering the formed polymer product.

6. The polymer product of claim 5 wherein the late transition metal bidentate chelate is represented by the formula:

(II)

wherein $R^1$ is a $C_4$–$C_{24}$ hydrocarbyl, a substituted $C_4$–$C_{24}$ hydrocarbyl, a $C_4$–$C_{24}$ hydrocarbyloxy or the $R^1$ group with an $R^2$ which is on a vicinal carbon atom together form a hydrocarbylene or hydrocarbyloxyene ring;

each $R^2$ independently is H, a $C_1$–$C_{24}$ hydrocarbyl, a substituted $C_1$–$C_{24}$ hydrocarbyl, an inert functional group, or any $R^2$ group with an $R^1$ or an $R^3$ group on a vicinal carbon atom together form a hydrocarbylene or hydrocarbyloxyene ring;

$R^3$ is H, a $C_1$–$C_{24}$ hydrocarbyl, a substituted $C_1$–$C_{24}$ hydrocarbyl, an inert functional group, or the $R^3$ group with an $R^2$ group on a vicinal carbon atom together form a hydrocarbylene ring;

each $R^4$ independently is H, a $C_1$–$C_{24}$ hydrocarbyl, or a substituted $C_1$–$C_{24}$ hydrocarbyl;

$R^5$ is a sterically bulky $C_6$–$C_{24}$ hydrocarbyl or a sterically bulky $C_6$–$C_{24}$ substituted hydrocarbyl, preferably an aryl, aralkyl, or a substituted aryl;

$R^6$ is H, a $C_1$–$C_{11}$ alkyl, aryl, or substituted aryl;

G is O, S, or an —NR group where R is a $C_1$–$C_{11}$ alkyl, aryl or substituted aryl;

S is a coordination ligand or an aprotic polar compound; and

M is a transition metal selected from Fe, Co, Ni, Ru, Rh, Pd, Os, Ir, and Pt in the +2 oxidation state.

7. The polymer product of claim 5 wherein the non-ionic late transition metal chelate is represented by the formula:

(III)

wherein $R^1$ is a $C_4$–$C_{24}$ hydrocarbyl, a substituted $C_4$–$C_{24}$ hydrocarbyl, a $C_4$–$C_{24}$ hydrocarbyloxy or the $R^1$ group with an $R^2$ which is on a vicinal carbon atom together form a hydrocarbylene or hydrocarbyloxyene ring;

each $R^2$ independently is H, a $C_1$–$C_{24}$ hydrocarbyl, a substituted $C_1$–$C_{24}$ hydrocarbyl, an inert functional group, or any two vicinal $R^2$ groups together or an $R^2$ group with an $R^1$ group on a vicinal carbon atom together form a hydrocarbylene or hydrocarbyloxyene ring;

each $R^4$ independently is H, a $C_1$–$C_{24}$ hydrocarbyl, or a substituted $C_1$–$C_{24}$ hydrocarbyl;

$R^5$ is a sterically bulky $C_6$–$C_{24}$ hydrocarbyl or a sterically bulky $C_6$–$C_{24}$ substituted hydrocarbyl, preferably an aryl, aralkyl, or a substituted aryl;

$R^6$ is H, a $C_1$–$C_{11}$ alkyl, aryl, or substituted aryl;

G is O, S, or an —NR group where R is a $C_1$–$C_{11}$ alkyl, aryl or substituted aryl;

S is a coordination ligand or an aprotic polar compound; and

M is a transition metal selected from Fe, Co, Ni, Ru, Rh, Pd, Os, Ir, and Pt in the +2 oxidation state.

8. A packaging material having at least one layer wherein at least one of said layer(s) comprises a polymer of claim 1.

9. A packaging material having at least one layer wherein at least one of said layer(s) comprises a polymer of claim 2.

10. A packaging material having at least one layer wherein at least one of said layer(s) comprises a polymer of claim 5.

11. A packaging material having at least one layer wherein at least one of said layer(s) comprises a polymer of claim 3.

12. A packaging material having at least one layer wherein at least one of said layer(s) comprises a polymer of claim 6.

13. A packaging material having at least one layer wherein at least one of said layer(s) comprises a polymer of claim 7.

14. A packaging article having a cavity capable of retaining an oxygen sensitive material therein, said article having a structure comprising at least one layer wherein at least one of said layer(s) comprises a polymer of claim 1.

15. A packaging article having a cavity capable of retaining an oxygen sensitive material therein, said article having a structure comprising at least one layer wherein at least one of said layer(s) comprises a polymer of claim 2.

16. A packaging article having a cavity capable of retaining an oxygen sensitive material therein, said article having a structure comprising at least one layer wherein at least one of said layer(s) comprises a polymer of claim 5.

17. A packaging article having a cavity capable of retaining an oxygen sensitive material therein, said article having a structure comprising at least one layer wherein at least one of said layer(s) comprises a polymer of claim 3.

18. A packaging article having a cavity capable of retaining an oxygen sensitive material therein, said article having a structure comprising at least one layer wherein at least one of said layer(s) comprises a polymer of claim 4.

19. A packaging article having a cavity capable of retaining an oxygen sensitive material therein, said article having a structure comprising at least one layer wherein at least one of said layer(s) comprises a polymer of claim 6.

20. A packaging article having a cavity capable of retaining an oxygen sensitive material therein, said article having a structure comprising at least one layer wherein at least one of said layer(s) comprises a polymer of claim 7.

* * * * *